Feb. 27, 1962 R. WAGNER 3,023,011

PHONOGRAPHIC RECORDING

Filed March 25, 1957

INVENTOR
Robert Wagner
By, George H. Fritzinger
Agt.

3,023,011

PHONOGRAPHIC RECORDING

Robert Wagner, Ford Road, Denville, N.J.

Filed Mar. 25, 1957, Ser. No. 648,294

4 Claims. (Cl. 274—46)

This invention relates to improvements in phonographic recording by the embossing method, and more particularly it relates to a novel recording technique wherein the record is provided to a novel recording technique wherein the record is provided with a shallow concave track or groove for receiving therein a smaller groove modulated according to a signal to be recorded.

Recording by the embossing method is done on record materials subject to cold flow such as of plastic. Records made of these materials are provided with a smooth face for receiving the sound modulated groove. However, in making the records as into a disk, sheet or belt, the record face is formed unavoidably with surface irregularities which provide a characteristic surface noise when the records are played. This surface noise is ordinarily increased further by the indentations and abrasive marks which tend to be formed accidentally by the handling of the records before they are recorded on. An object of my invention is to precondition the record surface prior to recording thereon by ironing out the surface irregularities, indentations, etc., so that the recorded record will have a substantially reduced surface noise. This preconditioning may be carried out by a burnishing operation over the entire record surface before the record is used in the recording machine; however, it is preferably carried out during the recording operation by a burnishing stylus ahead of the recording stylus.

An important feature of my invention resides in carrying out the burnishing operation with a stylus which forms in the record body a shallow, concave track or groove for receiving the laterally-modulated groove of the recording stylus. The upwardly-inclined side walls of such a track exert a centralizing influence on the recording stylus and tend also to place a limit on the amplitude of modulation of the recording stylus should any unduly loud signal be fed into the recorder. Thus possible crossover of the recording stylus from one groove or track to another is mitigated against.

In order to accentuate the centralizing effect of the preformed track on the recorder stylus, it is an object of my invention to provide such track in the record body in combination with a recording head mounted with a lateral compliance enabling the recording head to yield to the influence of the rising side walls of the track whereby to maintain the recording stylus in alignment with the bottom of the track notwithstanding slight irregularities in the feed of the carriage on which the recording head is mounted. By the same token, such compliant mounting relaxes the need for fine lateral adjustment of the recording head relative to the pretracking stylus and also it renders practical the use of the pretracking technique in making microgroove recordings of 500 grooves or more per inch. The complaint mounting of the recording head per se is however not herein claimed since the same is described and claimed in my pending application Serial No. 635,008, filed January 18, 1957, now Patent No. 2,941,810, granted June 21, 1960.

A further important object and feature of my invention is to make embossed recordings on a record body in the form of a convoluted modulated groove which is formed in connection with a pretracking stylus having a radius of curvature substantially greater than that of the recording stylus and which is biased sufficiently against the record to provide a track which, in width, is equal approximately to the groove pitch. This recording technique overcomes an inherent defect in records made by the embossing method because an embossed, convoluted groove has raised side walls tending to form a track or groove between the regular groove convolutions making it difficult to feed the reproducer stylus into the regular groove during reproducing. The present technique overcomes this difficulty by making the side walls of successive track convolutions substantially coincident with each other.

It is accordingly a further object of my invention to provide an improved phonographic recording of the embossed type which can be tracked positively by a reproducing stylus without intergroove engagement.

Another object is to provide improved microgroove recordings of the embossed type which are readily trackable by the reproducer stylus without intergroove engagement.

Another object is to provide improved recording machines for making embossed records with less inherent surface noise than has been heretofore possible.

Another object is to provide improvements in such recording machines which are adapted to enable such improved recordings to be made without need for extremely close mechanical tolerances or adjustments.

These and other objects and features of my invention will be apparent from the following description and the appended claims.

In the description of my invention reference is had to the accompanying drawings, of which:

Figure 1:
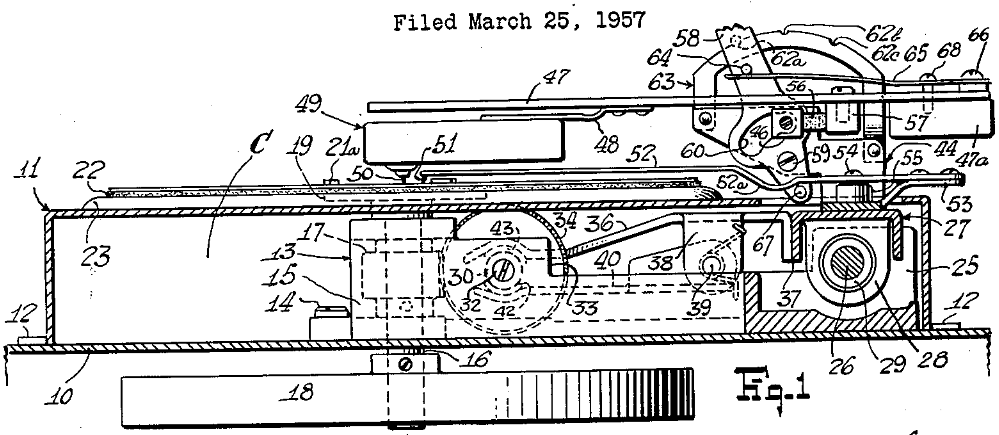
FIGURE 1 is a side elevational view, with parts shown in section on the line 1—1 of FIGURE 2, of an illustrative embodiment of phonographic machine according to my invention.
Figures 2, 5:
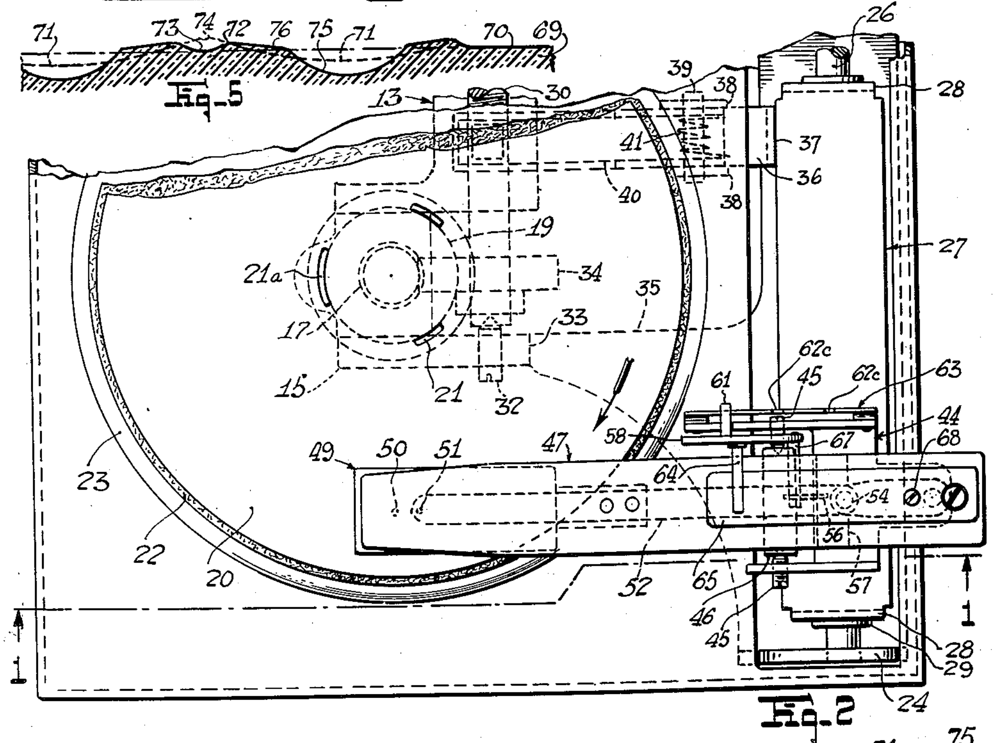
FIGURE 2 is a fractional plan view of the machine shown in FIGURE 1.
FIGURE 5 is a cross-sectional view to enlarged scale taken through a portion of a record body which has been recorded on in accordance with my invention.

The phonographic machine shown in FIGURES 1 and 2 comprises a mounting plate 10 which is supported by a lower housing structure not shown and which forms the base for an upper housing section 11 secured thereto as by lugs 12 struck outwardly from the housing section. Mounted in the cabinet C formed by the plate 10 and upper housing section 11 is a frame 13 cast as of aluminum. This frame seats flat on the plate 10 in the rearward half of the cabinet C (the right half of the machine as shown in FIGURES 1 and 2) and is secured to the plate by screws as indicated at 14. The frame has a hollow, rectangular, cage-like portion 15 at the center of the machine provided with vertically-spaced bearings in the upper and lower walls thereof in which a shaft 16 is journalled and extends through suitable clearance openings in the top and bottom walls of the cabinet C. The shaft is held vertically by abutment against the top and bottom walls of the cage 15 of a worm 17 secured to the central portion of the shaft. Secured to the lower end of the shaft is a large flywheel 18 on which may also ride a belt (not shown) for coupling the shaft to a drive motor (not shown). Secured to the upper portion of the shaft is a circular drive plate 19 having upwardly-struck drive lugs 21 for engaging corresponding arculately-shaped drive slots in the disk record and driving the record from its hub portion. Preferably one of the drive lugs, designated as 21*a*, has a greater arcuate length than the others for engaging a correspondingly-longer slot in the record and permitting the record therefore to be mounted in only one angular orientation to the shaft 16. The disk record is made of a thin, flexible, plastic material which can be recorded on by the embossing method, a material such as Vinylite being suitable. Since the record is supported by the plate 19 only at its hub, an annular stationary pad 22 of a yieldable material such as felt is provided around this plate for frictionally supporting the usable portion of the record. This pad is mounted on the top wall of the cabinet C as on a slightly-raised, circular platform 23 thereof, the top surface of the pad being just slightly higher than that of the central drive plate 19 to assure that the disk record will lie flat at all times on the supporting pad. An advantage in so supporting and driving the disk record is that machine vibration is prevented substantially from being transmitted to the usable portion of the record.

The frame 13 extends the full width of the cabinet C and has an upright standard 24 at its right side and a suitable standard 25 along its left side. These standards carry a transverse support rod 26 for a carriage 27. The carriage is in the form of a bail overlying the support rod and having apertured lugs 28 bent downwardly from the ends thereof. These lugs embrace the ends of a long, tubular bearing 29 which is slidable on the support rod. The carriage is driven progressively along the support rod by a feed screw 30 supported parallel thereto at the front thereof. The feed screw is journaled at its left end on a cone pivot (not shown) carried by the standard 25 and at its right end on a cone pivot 32 carried by the standard 33 upstanding from the frame 13 just to the rear of the right end of the cage 15. Secured to the right end portion of the feed screw is a gear 34 which meshes with the worm 17 on the drive shaft 16 to cause the feed screw to be driven as the record is rotated. The central bottom portion of the frame 13 has a large opening 35 to provide clearance for the gear 34. The means for coupling the carriage to the feed screw comprises a forwardly-extending arm 36 bracketed at 37 to the carriage. This arm terminates at its forward end in an arcuate finger overlying the feed screw. Bent downwardly from the intermediate portion of the arm 36 are side lugs 38 carrying a cross rod 39 on which a lower arm 40 is pivoted. The arm 40 terminates in an arcuate finger below the feed screw. Under influence of a torsion spring 41 between the lower arm 40 and one of the lugs 38, the two arms 36 and 40 are clamped against the feed screw, it being understood that the upper arm 36 which is rigid with the carriage can find an equalized clamping position with the other arm because the carriage is not only slidable but also rotatable on the support rod 26. Provided between the feed screw and the respective fingers embracing the same are pads 42 and 43 as of a resilient material such as felt. The feed screw is itself provided preferably with a multiplicity of very fine threads so that the friction pads will have a positive driving engagement therewith and provide a very even advance of the carriage because of the averaging out of the engagement of the individual threads with the pads as is described in my aforementioned application. Preferably, the feed screw is provided with a number of threads per inch equal to or not less than about half the number of grooves per inch to be provided on the record.

The advantage of a feed mechanism for the carriage as abovedescribed, comprising a finely-grooved feed screw engaged by clamping pads made as of felt, is that not only is there a positive and reliable uniform drive provided but also the carriage can nonetheless be moved by hand without the pads undergoing any appreciable wear. This eliminates the need for any control mechanism to release the pads as whenever the carriage is to be shifted either by hand or other means such as when it is to be returned to initial position or to be backspaced for listening back to prior portions of one's recorded dictation.

Onto the right end of the carriage 27 there is secured an upright U-shaped bracket 44. This bracket carries a pair of cone pivots 45 which pivotally engage the ends of a cross bar 46. A recorder-reproducer arm 47 is secured to this cross bar and extends forwardly therefrom over the right half portion of the mounted disk record 20. Secured to the forward portion of this arm through a cantilever spring 48 is a recorder-reproducer translating device 49 having a record-engaging stylus 50. The translating device may be of any standard variety and need not be herein specifically described other than to say that the stylus 50 is preferably vibrated laterally with respect to the arm to provide a laterally-modulated record groove in the disk record in response to the feeding of an alternating signal into the translating device while the machine is in operation. The advantage of the spring coupling 48 is to cushion the translating device vertically when the arm is lowered to engage the recording stylus with the record.

A feature of the present invention is in providing the disk record 20 with a burnished track for the recording stylus, which is formed preferably during the recording operation by providing a pretracking stylus 51 ahead of the recording stylus. This pretracking stylus is moved with the carriage by a mounting thereon which is rigid in directions of carriage movement but which is movable at right angles thereto to permit the stylus to be shifted into and out of engagement with the record. This mounting may comprise simply a flat cantilever spring 52 carrying the stylus 51 at its outer end and secured at its base end to a rearwardly-extending arm 53 on the bracket 44. Ahead of the bracket is an adjusting screw 54 passing through a clearance hole in the spring and threading into a boss 55 on the carriage to permit the bias pressure of the stylus against the record to be set to the desired value.

The pretracking stylus is used preferably with a mounting on the carriage for the recorder arm 47 which is compliant in directions of the carriage movement as illustrated in FIGURES 1 and 2. This compliant mounting comprises a flat spring 56 in a plane at right angles to the disk record, which is interposed between the cross bar 46 and a block 57 secured to the underside of the recorder arm. In order to damp suitably the transverse vibratile movement of the recorder arm, the intermediate portion of the spring 56 between the cross bar 46 and block 57 is encased in a body of damping material such as that known commercially as Viscoloid. Typically, the compliance of the spring 56 is such in relation to the rotational mass of the recorder arm that the natural resonance of the arm is at the lower end of the audio frequency spectrum.

When a compliant recorder-arm mounting is used, the conditioning of the machine for reproducing is simplified as is described in my pending application hereinbefore mentioned. This simplification arises because the compliant mounting is also sufficient to enable ease of tracking of the stylus during reproducing. The selective mechanical conditioning of the machine for reproducing requires therefore only a reduction in the bias force of the stylus 50 against the record and the lifting of the pretracking stylus 51 from the record. This is carried out simply by a control lever 58 pivoted at 59 to the left leg of the bracket 44 at a point below the respective cone pivot 45. This lever projects upwardly from its pivot axis to form a handle above the recorder arm, and it has a suitable arcuate opening 60 to clear it from the respective cone pivot 45. The lever is detentable in forward-recording position, a central-reproducing position, or a rearward-neutral position by engagement of a cross pin 61 on the lever with respective notches 62*a*, 62*b* and 62*c* provided in an arcuate edge of a bridge member 63 mounted at its ends also on the left leg of the bracket 44. The lever 58 carries also a cross pin 64 overlying the recorder arm, and in cooperation therewith is a cantilever spring 65 secured by a secrew 66 to a counterweight-extension 47*a* of the recorder arm. This spring 65 extends forwardly past the pivots 45 and past the cross pin 64. When the control lever 58 is detented in its record position, the cross pin 64 bears downwardly against the forward end of the cantilever spring 65 to increase the bias force of the recorder stylus against the record to a value suitable for recording. When the control lever is detented in its reproduce position, the pin 64 is free of the spring 65 to cause the pressure of the recorder stylus to be suitably reduced for reproducing; also, there is a cross pin 67 on the lower end of the control lever 58 which now bears upwardly against an intermediate, bowed portion 52*a* of the spring 52 to lift the pretracking stylus 51 from the record. Further, when the control lever 58 is in a neutral position, the pin 64 bears against the spring 65 to the rear of the cone pivots 45 to tilt the recorder arm upwardly and disengage the reproducer stylus from the record, and also the pin 67 now continues to engage the bowed spring portion 52*a* to hold still the pretracking stylus from the record. An adjusting screw 68 passes through a clearance opening in the spring 65 and threads into the recorder arm to permit adjustment of the bias pressure of the recorder stylus against the record when the control lever 58 is in its recording position, it being understood that this bias pressure is increased as the adjusting screw is released, and vice versa.

The pretracking stylus 52 is preferably positioned so that it is directly ahead of and in alignment with the recorder stylus with respect to the groove to be formed by the latter but may alternatively be placed ahead of the recorder stylus by one or more full groove convolutions. Also, the pretracking stylus is provided with an arcuate record-engaging tip adapted to form a concave track or groove in the record surface by embossing, the radius of curvature of the pretracking stylus being greater than that of the recording stylus suitably by a ratio of about two to one. Further, in accordance with an important feature of the invention, the bias pressure of the pretracking stylus is set so that the track formed thereby will have a width equal approximately to the groove pitch. In other words, the side edges of the raised side walls of successive tracks are made substantially coincident with one another, the advantage of which is that the usual intergroove track which is characteristic of embossed recordings is eliminated to assure positive feed of the reproducer stylus into the sound groove on the record when the record is played. This is demonstrated by reference to FIGURES 5 and 6 showing, to enlarged scale, an approximate representation of the type of record track and groove formed in the disk record when the same is recorded on in accordance with the present invention.

Figure 6:
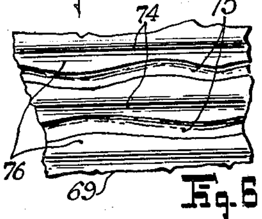
FIGURE 6 is a plan view to a lesser scale of enlargement of a fractional portion of such record body.

The record body portion 69 shown in FIGURES 5 and 6 respectively in cross section and in plan has a smooth recording face 70 before the same is recorded on. The action of the pretracking stylus 51 is to form successive tracks indicated by the dotted concave lines 71. Since the pretracking stylus operates by embossing, it displaces the record material to produce the raised side walls 72 equal in volume above the line 70 to the volume of that displaced below this line. Since the tracks 71 are equal approximately to the pitch of the successive convolutions, these side walls are nearly coincident, there being at most only a small recess 73 between successive track convolutions if the tracks are slightly narrower than the groove pitch or a slight ridge 74, dottedly shown, if the width is approximately equal to the pitch. The recording stylus 50 engages the bottom of the track 71 and forms a deeper and narrower groove 75 therein which is modulated sidewise in accordance with the signals being recorded as shown in FIGURE 6. Since the recorder stylus also operates by embossing, it displaces material from the center of the track to the sides thereof such that the volume displaced from below the line 71 equals that of the side walls 76 between the lines 71 and 75. However, the bias pressure of the recorder stylus is preferably so controlled that the raised wall portions 76 will not have a reversed curvature to form any groove or track between successive groove convolutions. Thus, whenever a reproducer stylus is lowered onto the recorded surface of the record it will be fed positively into the bottom of the sound modulated groove 75.

An advantage of using a recorder arm with lateral compliance in combination with a pretracking stylus is that the recorder stylus can yield to the slanting side walls of the track and ride in the bottom thereof notwithstanding slight lateral out-of-alignments in the mountings of the recorder and pretracking styli or slight variations in the feed of the carriage. This relieves therefore the need for extremely close tolerances in the styli mounting apparatus and feed mechanism.

Also, when the compliant recorder-arm mounting is used, the inclined side walls of the track 71 are particularly effective in limiting over-modulation of the recorder stylus should any unduly high level of signal be fed into the recorder head, as has been described before in my prior-mentioned pending application. This eliminates the need for close monitoring of the signal level to prevent possible groove crossover from excessively high level of signal fed into the recorder head—which is particularly advantageous when microgroove recordings of the order of 500 or more grooves per inch are made.

Figure 3:
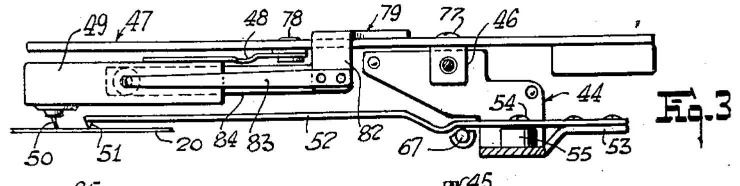
FIGURE 3 is a side elevational view of the mounting means for the recorder head and pretracking stylus in accordance with an alternative embodiment of any invention.
Figure 4:
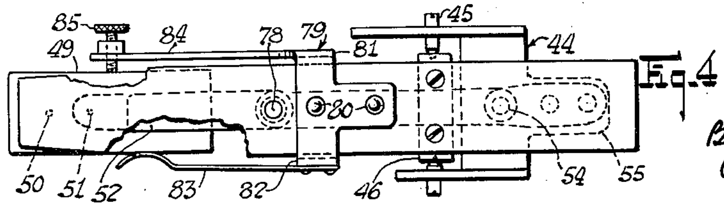
FIGURE 4 is a plan view, with parts broken away, of the structure shown in FIGURE 3.

Although various advantages follow, as heretofore described, when the pretracking stylus is used with a compliant recorder-arm mounting, no unnecessary limitation of the invention to such compliant mounting of the recorder arm is intended. In FIGURES 3 and 4, for example, the cross bar 46 on the pivots 45 is secured rigidly to the recorder arm 47 by screws 77 so that the recorder arm will have only vertical freedom for movement of the recorder stylus into and out of engagement with the record. However, in order to provide easy lateral adjustment of the recorder head 49 with respect to the recorder arm, to enable the recorder stylus to be positioned in true alignment with the pretracking stylus, the cantilever mounting spring 48 for the recorder head is pivoted at its base on a stud 78 mounted on the recorder arm. Also, a bracket 79 is secured by rivets 80 onto the recorder arm and is provided with depending lugs 81 and 82 at the sides of the recorder arm. Secured to the right lug is a cantilever spring 83 which bears against the right side of the recorder head, and projecting forwardly from the left lug is an integral arm 84 carrying a jewel screw 85 which bears against the left side of the recorder head. Thus, by turning the jewel screw, lateral microadjustments of the recorder head are made to place the recorder stylus into close groove alignment with the pretracking stylus. Although this alternative embodiment, insofar as is here described, is adapted only for recording, it will be understood that the sidewise constraint on the recorder head may be relieved by any suitably shiftable means and in any of various suitable ways well known in the art, for example, as by removing the constraint of the parts 80—83—85 from the head to allow it to pivot sidewise on the stud 78, so that the stylus 50 may track a recorded groove to operate also as a reproducer.

The particular embodiments of my invention herein shown and described are intended to be illustrative and not limitative of my invention since the same are subject to changes and modifications without departure from the scope of my invention, which I endeavor to express according to the following claims.

I claim:

1. In a phonographic machine having a revolvable support for a record of embossable material: the combination of a translating head having a recording stylus for engaging said record and forming a modulated groove therein by embossing, a carriage for said translating head mounted for traveling movement, means for progressively advancing said carriage as said record support is revolved to cause said recording stylus to form a convoluted groove in the record, means mounting said translating head on said carriage with lateral compliance in directions of travel of said carriage a pretracking stylus mounted on said carriage for engaging the record and forming a convoluted track therein ahead of said recording stylus as the record support is revolved, said pretracking stylus having a substantially arcuate record-engaging surface and being biased against the record to cause the track formed thereby to have a width equal approximately to the groove pitch, and shiftable means for selectively disengaging said pretracking stylus from the record and concurrently reducing the pressure of said recording stylus on the record to condition said translating head for operation as a reproducer.

2. In a phonographic recording machine having means for rotating a disk record of an embossable material: the combination of a translating head provided with an embossing stylus, a carriage for said translating head, means for progressively advancing said carriage as said disk record is rotated to cause said embossing stylus to define a spiral groove on the face of said record, said embossing stylus being laterally vibratable responsive to a signal fed to said translating head, and a surface-conditioning means on said carriage comprising a pretracking styus adapted to engage the face of the record and provide a burnished concave surface thereon by embossing ahead of said embossing stylus and in groove alignment therewith, said pretracking stylus having a radius of curvature approximately twice the radius of curvature of said embossing stylus and being biased against the record with a force adapted to cause the pretracking stylus to form a track having a width equal approximately to the groove pitch, the slanting side walls of said concave surface of the track being adapted to provide an increasing resisting force to the lateral vibrations of the embossing stylus tending to limit said vibrations within the confines of the track.

3. In a phonographic machine having a revolvable support for a record of embossable material: the combination of a head carriage mounted for traveling movement; a pregrooving stylus mounted rigidly on said carriage in directions of travel thereof; means for progressively advancing said carriage as said support is revolved to cause said pregrooving stylus to describe a convoluted pregroove on the record, said stylus having an arcuate record-engaging surface and being biased against the record with a pressure adapted to cause said pregroove to be substantially arcuate in cross section and to have a width equal approximately to the groove pitch; a recording head having an embossing stylus for engaging said record and forming a modulated groove therein as signal energy is fed into the head; means mounting said recording head on said carriage with lateral compliance in directions of travel of the carriage and in a position wherein the embossing stylus is behind said pregrooving stylus in groove alignment therewith, said embossing stylus being provided with a record-engaging surface having a substantially smaller radius of curvature than that of said pregrooving stylus and being biased against the record to indent the record and form a modulated groove within said pregroove, said compliance of the mounting means of said recording head being yieldable to the slanting effect of the side walls of said pregroove on said embossing stylus to cause the recording stylus to track said pregroove as said support is revolved.

4. In a phonographic recording machine having means for rotating a disk record of an embossable material: the combination of a translating head provided with an embossing stylus, a carriage for said translating head, means for progressively advancing said carriage as said disk record is rotated to cause said embossing stylus to define a spiral groove on the face of said record, said embossing stylus being laterally vibratable responsive to a signal fed to said translating head, a surface-conditioning means on said carriage comprising a pretracking stylus adapted to engage the face of the record and provide a burnished concave surface thereon by embossing ahead of said embossing stylus and in groove alignment therewith, said pretracking stylus having a radius of curvature approximately twice the radius of curvature of said embossing stylus and being biased against the record with a force adapted to cause the pretracking stylus to form a track having a width equal approximately to the groove pitch, the slanting side walls of said concave surface of the track being adapted to provide an increasing resisting force to the lateral vibrations of the embossing stylus tending to limit said vibrations within the confines of the track, means mounting said translating head on said carriage with lateral compliance whereby the slanting side walls of the concave surface of said track exert a centralizing influence on the embossing stylus, and means for selectively disengaging said pretracking stylus from the record and concurrently reducing the bias pressure of said embossing stylus whereby to condition said machine to operate as a reproducer.

References Cited in the file of this patent

UNITED STATES PATENTS

| | | |
|---|---|---|
| 1,342,442 | Heck | June 8, 1920 |
| 1,444,960 | Emerson | Feb. 13, 1923 |
| 1,976,560 | Hewitt | Oct. 9, 1934 |
| 2,643,886 | Ghilini | June 30, 1953 |